2 Sheets—Sheet 1.

J. HALEY.
Machine for Welding Chain Links.

No. 202,258. Patented April 9, 1878.

Witnesses:
J. W. Garner
Will. H. Kerr

Inventor:
Jno. Haley,
per
J. A. Lehmann,
Atty.

2 Sheets—Sheet 2.

J. HALEY.
Machine for Welding Chain Links.

No. 202,258. Patented April 9, 1878.

Witnesses:
J. N. Garner
Will H. Kern

Inventor:
Jno. Haley
per
J. A. Lehmann,
Atty.

UNITED STATES PATENT OFFICE.

JOHN HALEY, OF NEW BRIGHTON, PENNSYLVANIA.

IMPROVEMENT IN MACHINES FOR WELDING CHAIN-LINKS.

Specification forming part of Letters Patent No. 202,258, dated April 9, 1878; application filed March 9, 1878.

*To all whom it may concern:*

Be it known that I, JOHN HALEY, of New Brighton, in the county of Beaver and State of Pennsylvania, have invented certain new and useful Improvements in Machines for Welding Chain-Links; and I do hereby declare the following to be a full, clear, and exact description of the invention, such as will enable others skilled in the art to which it pertains to make and use it, reference being had to the accompanying drawings, which form part of this specification.

My invention relates to an improvement in machines for welding chain-links, and forms part of a system for finishing the links after welding them together, so as to form a perfect chain.

The dies herein used are essentially of the same form and action as described in Letters Patent of the United States No. 197,123, granted to me November 13, 1877, with an improvement hereinafter fully described.

The accompanying drawings represent my invention.

Figure 1:
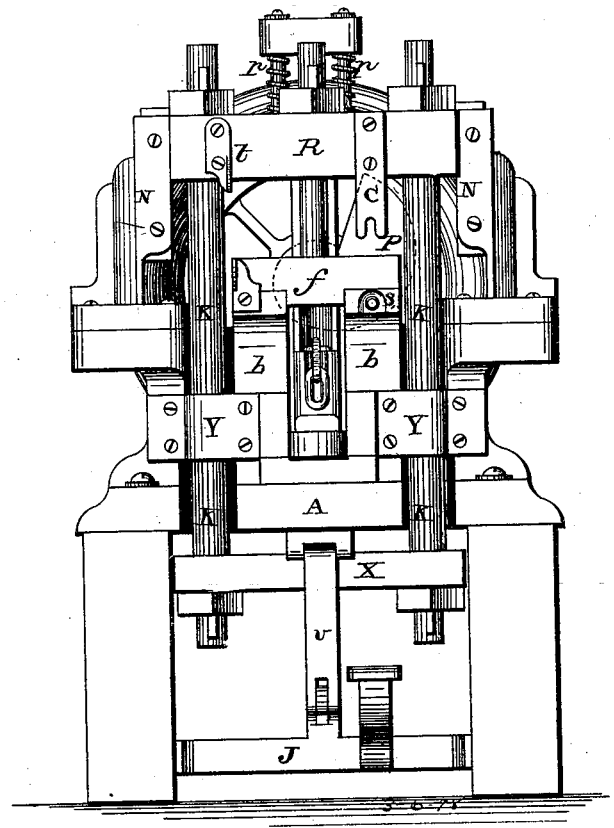
Figure 2:
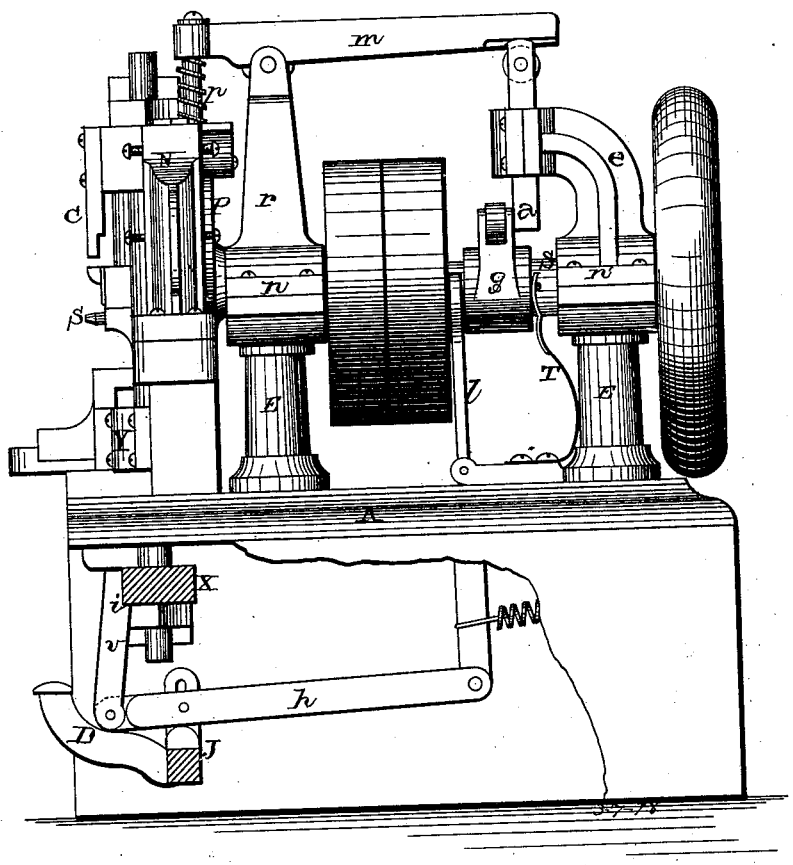
Figure 2:
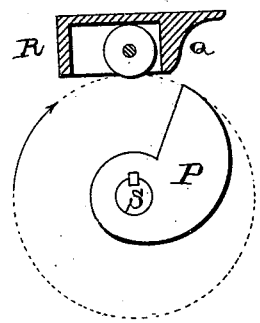

Figure 1 is a front elevation of the machine, showing, first, the gate or drop-hammer when elevated in its guides to its greatest height, just before dropping upon a link in the die; second, the treadle with its levers, by which the action of the hammer is controlled; third, the device for finishing the link by removing any unevenness that may have remained after the welding process. Fig. 2 represents a side view of the machine, showing the position of the shaft, with its devices to communicate and arrest motion, and the lever, provided with springs to impart additional power to the descending hammer.

The bed-plate A gives support to the standards N N and E E. Near the base of the standards N N is bolted the cross-piece Y, upon which rests the lower die or matrix within a frame composed of the pieces b b f, which frame is rigidly attached to the cross-piece Y. Bars K K, connected at their lower ends by the cross-piece X, pass through holes in the cross-piece Y, between the standards N N and the side pieces b b of the frame, and their upper ends, after passing through the cross-piece R, are there secured, thus forming a gate composed of the vertical bars K K and horizontal cross-pieces R and X. In the cross-piece R is fastened the swaging-die, its lower end being guided by the part f, through which it passes; and the cross-piece R, when allowed to descend to its farthest extent, rests upon this part f.

The swaging-die may be adjusted by means of a screw on top of the cross-piece R, or otherwise, to suit the work to be performed.

The lip of the upper die, which is beveled at the inside, and which in the patent referred to is described as increasing in depth from both sides toward the center, is changed so as to extend equally around the die, so that when the die is raised to its highest point the lower edge of the lip still remains in contact with the matrix, and forms a guard around it, so as to facilitate the placing of the blank into its proper place, serving as a check to arrest it when pushed in. This is especially of advantage in making chain of a small size, when great care is required for the accurate placing of the blanks in the die. The pin in this die to prevent the link from being misplaced during the process of welding, as stated in my former patent, is, in my present improvement, inserted, instead of being made of a piece with the die. By this means there is a degree of elasticity imparted not otherwise obtainable, which prevents the pins from rapidly wearing out.

The piece R, constituting the upper part of the gate or drop-hammer, has at its ends suitable projections to slide in the upper ends of the standards N N, and these are so arranged as to admit of being adjusted to the desired size by means of an internal lining, controlled by set-screws, wedges, or otherwise. Thus the gate in its movement is securely held not only by the bars K K in their passage through the holes in the cross-piece Y, but also in the guides in the upper ends of the standards N N.

In front, but at the side and lower edge of the part f, is a recess, s, in the form of half the link of a chain, and in its center is a projecting pin, terminating in a truncated cone; and secured to the part R, above the recess s, is an arm, C, with a slanting shoulder cut at its inside, near the end, and a semicircular opening at its lower edge to admit the pin.

When, after welding the link, it is found to be imperfect, be it from excess of metal or other cause, the link is suspended on the pin and the arm C made to descend, and the gradual pressure exerted by the slant of the shoulder, combined with a lateral pressure, will remove the fault.

At a right angle with the front of the machine and behind its center is the shaft S, having its bearings on top of the standards E E. Between the standards are two pulleys of equal diameter, the one rigidly attached to the shaft, the other running loose upon it, and a collar, $g$, with a projection similar to a crank. This collar cannot turn independently of the shaft, being prevented by a pin, which extends through it into a longitudinal groove in the shaft, but may slide back and forth. In the end of the projection of the collar $g$ is a friction-roller.

The spring T, when not pressed back by the arm of the lever $l$, pushes and holds the collar $g$ against the forked arm of that lever, which has its fulcrum near the bed-plate A, under the shaft S; but when the pressure of said spring is counteracted by that lever and overcome by its power, the collar is forced into a position where the projecting friction-roller is, at every revolution of the shaft, brought in contact with a vertically-moving lifter, $a$. This lifter is held and moves in a bent arm, $e$, which forms part of the cap $n'$ of the journal of the shaft S, and has on its upper end a friction-roller. This friction-roller is in contact with the longer arm of a lever, $m$, which has its fulcrum upon a support, $r$, based upon the cap $n$ of the journal of the shaft S, and lifts up that arm at every revolution, thereby causing the shorter arm of the said lever $m$ to become as often depressed. Under the shorter arm of the lever $m$, and attached to a short cross-piece, are two spiral springs, $p\ p$, which bear down upon the upper part of the gate R whenever, by the revolution of the shaft and its intermediate devices, the longer arm of the lever $m$ is lifted, and impart additional power to the descending die.

The cam P is rigidly attached to the inner end of the shaft S, and lifts and again drops the gate at every revolution when the machine is in gear. At the point of contact between the cam and the rear part of the cross-piece R a friction-roller is introduced, to prevent the lifting edge of the cam from wearing; and adjoining the roller is a check, $q$, by which a retrograde motion of the cam is obstructed and a sudden descent of the gate secured.

Under and to the cross-piece Y, in front of the piece X, is pivoted a lever, $v$, which lever, by means of a toggle, operates the levers $h$ and $l$, of which the latter actuates the sliding collar $g$. The lever $h$ is connected by a pivot with an arm of a cross-piece, J, that is journaled in the sides of the foundation of the bed-plate A, and has a treadle, D, extending forward within easy reach of the foot of the operator. The rear side of the lever $v$, at its upper end, is cut away, and a shoulder, $i$, formed, which offers a rest for the lower cross-piece X of the gate when elevated.

A spiral spring is attached to the under side of the bed-plate A, and the other end of it to the lever $l$, with a tendency to draw this lever away from the sliding collar $g$, while the spring T pushes the collar toward it.

The operation of the machine and its individual parts is as follows: The gate, being elevated, rests upon the shoulder $i$ of the lever $v$. When in this position the spiral spring has drawn the levers $l$ and $h$ back toward itself; consequently the lever $v$, being connected with $h$, is likewise acted upon, and upholds the gate. By this same action of the lever $h$ the arm on the cross-piece J is drawn back and the treadle raised. The upper arm of the lever $l$ being thus removed from the sliding collar $g$, the spring T has pushed said collar toward the forked head of that lever. The cam P is out of reach of the gate.

If, now, the motive power be applied to the fixed pulley, the shaft S, with the collar $g$, revolves without imparting its motion to any other part of the machine, and, the die being open, the blank that is to be welded may be introduced into its proper place. When this has been done the operator, placing his foot upon the treadle, depresses it, and by so doing sets the whole machine instantaneously in motion. The shoulder $i$ of the lever $v$ has now withdrawn its support from the gate, the gate falls, and in its descent is accelerated by the springs $p\ p$. The lever $l$ has pushed the collar $g$ toward the yielding spring T, and the collar, now being under the lifter $a$, lifts it at every revolution of the shaft, whereby the lever $m$ is made to press down the springs $p\ p$. The cam, at every revolution, raises and drops the gate, and continues so to do as long as the pressure upon the treadle remains; but as soon as it is removed the spiral spring, exerting its force against the released levers, draws them back, and the shoulder $i$ intercepts the descent of the gate, while the collar $g$ is pushed from under the lifter $a$, and the whole operation of the machine stopped.

Thus the machine may be made to make one or any number of strokes in succession, as may be desired, by simply pressing down the treadle; and if any link should be found defective, it may, by a blow or a succession of blows, be made perfect by means of the arm C, and the pin constructed for that purpose.

To the front of the cross-piece R, and to that of the part $f$ within reach of the operator, are attached the two halves of a cutting device, $t$, for cutting defective links from the chain when discovered after having been welded.

Having thus described my invention, I claim—

1. The shaft S, having the cam P secured thereto, in combination with the cross-piece R, a friction-roller, stop $q$, spring $p$, lever $m$, lifter $a$, and cam $g$, substantially as shown.

2. The lifter $a$, with a friction-roller at its upper end, in combination with the lever $m$, cam $g$, cross-head R, and springs $p$ $p$, substantially as shown and described.

3. In a machine for welding chain-links, the combination of the levers $v$, $h$, and $l$, cam $g$, lifter $a$, lever $m$, and springs $p$, with the journaled cross-piece J, treadle D, and spiral spring, the lever $v$ being provided with the shoulder $i$ for supporting the gate, substantially as set forth and described.

4. In a machine for welding chain-links, a swaging-die, provided with an elongation or lip beveled at its inside and extending around it, and of a length to remain in contact with the matrix when the dies are separated to place a link between, substantially as and for the purpose set forth.

In testimony that I claim the foregoing I have hereunto set my hand this 25th day of February, 1878.

JOHN HALEY.

Witnesses:
ALEX. R. OTO,
HENRY CREIGHTON.